Patented Dec. 24, 1929

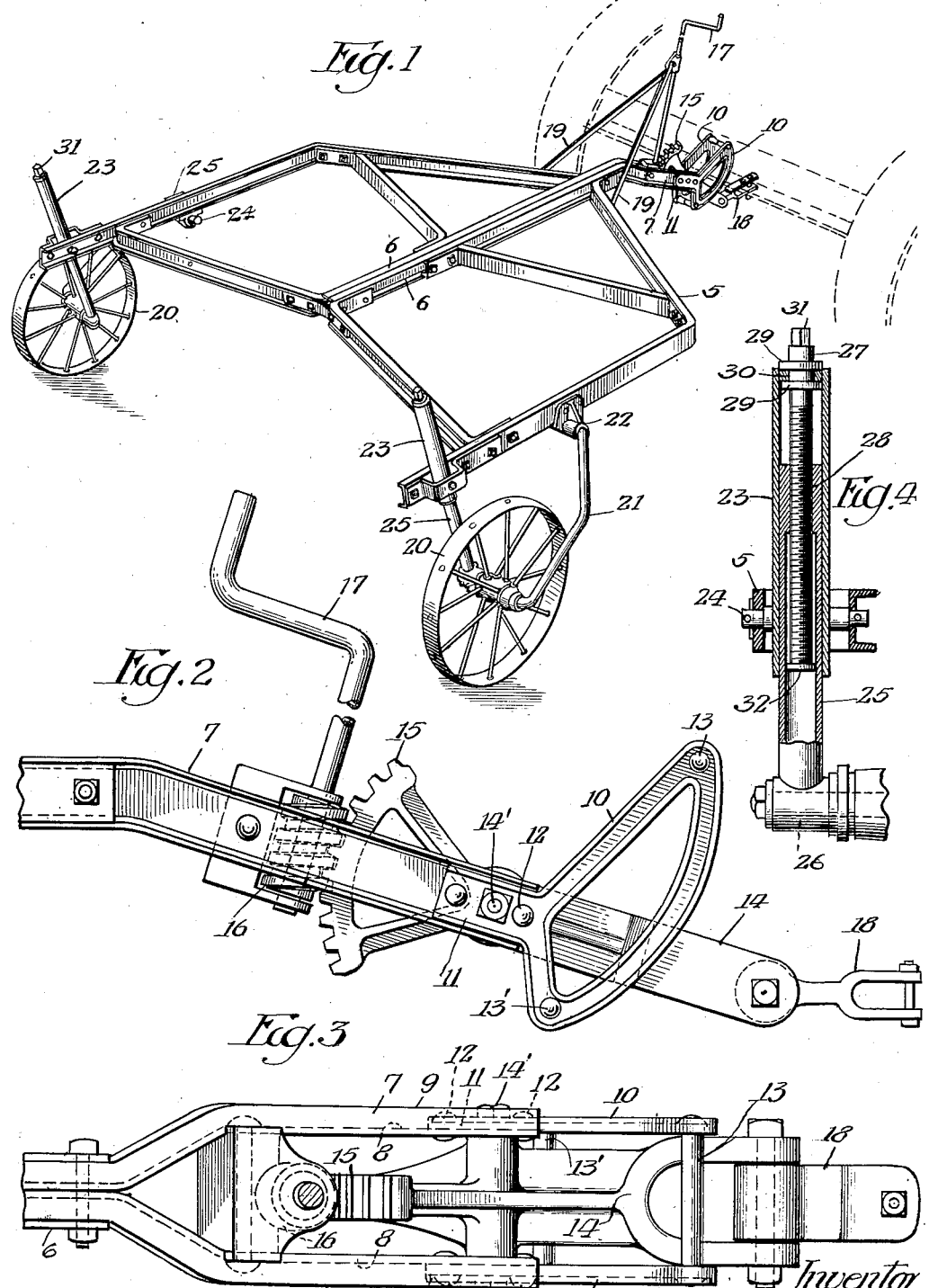

1,740,841

UNITED STATES PATENT OFFICE

EDWARD M. SMITH, OF PEORIA, ILLINOIS, ASSIGNOR TO BROWN LYNCH SCOTT CO., OF MONMOUTH, ILLINOIS, A CORPORATION OF ILLINOIS

WHEELED-HARROW-FRAME ADJUSTMENT

Application filed January 19, 1928. Serial No. 247,805.

This invention relates to improvements in wheeled harrows and its object is to provide simple means of novel construction which can be easily and quickly operated to vary the depth of cut of the disk gangs and also to raise the disk gangs out of operative position for transporting the harrow from place to place.

The invention also has for its object to improve the harrow of Patent No. 1,531,278, patented March 31, 1925, and to provide adjusting means which are adaptable for that harrow and the improved frame disclosed in the application of John H. Flatley, Serial No. 249,581, filed Jan. 26, 1928.

In the accompanying drawings illustrating a selected embodiment of the invention:

Fig. 1 is a perspective view of a wheeled harrow frame with the invention embodied therewith, the disk gangs being omitted.

Fig. 2 is a detail enlarged view of the front end adjusting means.

Fig. 3 is a top plan view of the means shown in Fig. 2.

Fig. 4 is a sectional view through the rear end adjusting means for one wheel.

Referring to the drawings 5 designates generally the frame which comprises two center bars 6, 6 which are bent and spread downwardly to form the spaced connecting bars 7, 7 (Fig. 3). The bars 7, 7 are made of channel iron with the webs 8, 8 on the inside and the flanges 9, 9 projecting outward therefrom. Parallel skeleton guides 10 are carried by the bars 7, 7 and are provided with rearwardly projecting arms 11 which are seated against the webs 8, 8 of the bars 7, 7 and between the flanges 9, 9. The arms are secured to the bars by bolts or rivets 12, 12. The two guides 10, 10 are connected by rods 13, 13' located respectively at the top and bottom of the guides. A draft lever 14 is pivotally mounted in a suitable manner between the arms 7, 7 and it is provided with a toothed segment 15. A worm gear 16 is supported between the bars 7, 7 and meshes with the segment gear 15 and is operated by a crank 17. The draft lever 14 projects forward between the two guides 10, 10 and also between the rods 13 and 13' and it carries a clevis 18, or other suitable device at its front end for connecting the harrow to a tractor or other machine. Braces 19, 19 are connected to the crank 17 and to the frame for holding the crank in rigid upright position. The height of the clevis 18 is substantially fixed by its connection with the tractor and, therefore, manipulation of the crank 17 will result in causing the draft lever 14 to swing on its axis with the clevis as a fulcrum to raise or lower the front end of the harrow for adjusting the depth of cut of the disks and also for lifting the disks above the ground for transporting the harrow. The guides support and reinforce the draft lever especially in turning movements.

This front end adjustment is covered by my divisional application Serial No. 409,044, filed November 22, 1929.

Each of the rear wheels 20 is provided with an individual adjusting device and each rear wheel is also mounted on one end of an arm 21 which is pivotally connected at its other end to the harrow frame, the ends of the arm being conveniently bent into substantially parallel relation to form an axle for the wheel and a journal operating in the bearing 22 on the frame. It is desirable to be able to raise and lower the frame by raising and lowering the wheel and this is accomplished by a device connected with the end of the axle and with the frame. This device comprises a tubular member 23 which is swiveled at 24 in the frame 5; another tubular member 25 is pivotally engaged with the axle 26 and telescopes in the outer tubular member 23 (Fig. 4). A screw bolt 27 is arranged to turn but not to move lengthwise in the outer tubular member 23 and it has threaded engagement with the inner tubular member at 28. This screw bolt is conveniently provided with annular flanges 29, 29 which engage opposite sides of an internal annular flange 30 on the outer tubular member 28 whereby the screw bolt may be turned, by applying a suitable tool to the squared end 31, without causing the bolt to travel lengthwise in the member, but turning the screw bolt will cause the members 23, 25 to telescope as may be required for adjusting the wheel and the frame relatively. The screw bolt is preferably provided with an annular flange 32 at its lower end to operate as a guide in the inner tubular member 25.

The invention provides means of simple construction which can be easily and accurately operated for adjusting the frame to satisfy any conditions which may be met in the practical operations of the harrow under usual conditions. The crank 17 may be made detachable for use on the screw bolts 27 so that one crank will answer for all three adjustments. It has been found in practice that these devices are not only easily operated, but they can be accurately operated without especial skill and they are strong and substantial in construction.

I have shown the invention in the form which has been found satisfactory for the purposes intended, but I reserve the right to make all such changes therein as fairly fall within the scope of the following claims.

I claim:

1. The combination of a harrow frame, an axle mounted on the frame, a carrying wheel on said axle, and means for adjusting the wheel relative to the frame comprising a tubular member swiveled to the frame, a tubular member pivoted on the axle, said tubular members being telescopic, and means for adjusting one of said members relative to the other.

2. The combination of a harrow frame, an axle mounted on the frame, a carrying wheel on said axle, means for adjusting the wheel relative to the frame comprising a tubular member swiveled to the frame, a tubular member pivoted on the axle, the tubular member on the axle telescoping in the tubular member on the frame, a screw bolt rotatively mounted in the tubular member on the frame and threadedly engaging the tubular member on the axle, means for preventing longitudinal movement of the screw bolt relative to the tubular member on the frame, and means for operating said bolt.

3. The combination of a harrow frame, an axle mounted on the frame, a carrying wheel on said axle, means for adjusting the wheel relative to the frame comprising a tubular member swiveled to the frame, a tubular member pivoted on the axle, the tubular member on the axle telescoping in the tubular member on the frame, a screw bolt rotatively mounted in the tubular member on the frame and threadedly engaging the tubular member on the axle, interengaging annular flanges on the tubular member on the frame and the screw bolt to permit rotation of the bolt but preventing longitudinal movement of the bolt relative to said tubular member on the frame, and means for rotating the bolt.

EDWARD M. SMITH.